United States Patent
Takemoto et al.

(10) Patent No.: US 12,111,530 B2
(45) Date of Patent: Oct. 8, 2024

(54) POLYMER-DISPERSED-TYPE LIQUID CRYSTAL FILM, EMULSION, AND METHOD FOR PRODUCING POLYMER-DISPERSED-TYPE LIQUID CRYSTAL FILM

(71) Applicant: NITTO DENKO CORPORATION, Ibaraki (JP)

(72) Inventors: Hiroyuki Takemoto, Ibaraki (JP); Jin Yoshikawa, Ibaraki (JP); Masanori Otsuka, Ibaraki (JP); Mariko Hirai, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 123 days.

(21) Appl. No.: 17/916,208

(22) PCT Filed: Mar. 29, 2021

(86) PCT No.: PCT/JP2021/013312
§ 371 (c)(1),
(2) Date: Sep. 30, 2022

(87) PCT Pub. No.: WO2021/200828
PCT Pub. Date: Oct. 7, 2021

(65) Prior Publication Data
US 2023/0341721 A1 Oct. 26, 2023

(30) Foreign Application Priority Data
Mar. 31, 2020 (JP) .................................. 2020-062801

(51) Int. Cl.
*G02F 1/1334* (2006.01)
*B32B 27/08* (2006.01)
(Continued)

(52) U.S. Cl.
CPC ............ *G02F 1/1334* (2013.01); *B32B 27/08* (2013.01); *B32B 27/36* (2013.01); *B32B 37/24* (2013.01);
(Continued)

(58) Field of Classification Search
None
See application file for complete search history.

(56) References Cited

U.S. PATENT DOCUMENTS

| | | |
|---|---|---|
| 4,834,509 A | 5/1989 | Gunjima et al. |
| 4,992,201 A | 2/1991 | Pearlman |

(Continued)

FOREIGN PATENT DOCUMENTS

| | | |
|---|---|---|
| EP | 0 156 615 A2 | 10/1985 |
| JP | 2550627 B2 | 11/1996 |

(Continued)

OTHER PUBLICATIONS

International Search Report issued on Jun. 8, 2021, for corresponding International Patent Application No. PCT/JP2021/013312, along with an English translation (5 pages).
Written Opinion issued on Jun. 8, 2021, for corresponding International Patent Application No. PCT/JP2021/013312 (3 pages).
(Continued)

*Primary Examiner* — Thanh Nhan P Nguyen
(74) *Attorney, Agent, or Firm* — HAUPTMAN HAM, LLP

(57) ABSTRACT

According to the present invention, provided is a PDLC film, which includes a PDLC layer excellent in thickness uniformity and is suppressed from causing liquid crystal leakage from the PDLC layer. A method of producing a polymer dispersed liquid crystal film of the present invention includes: applying, to a first transparent conductive film, an emulsion including a solvent, and polymer particles and liquid crystal particles dispersed in the solvent to form an applied layer; drying the applied layer to form a polymer
(Continued)

dispersed liquid crystal layer containing a polymer matrix and the liquid crystal particles dispersed in the polymer matrix; and laminating a second transparent conductive film on the polymer dispersed liquid crystal layer, wherein the polymer particles include first polymer particles and second polymer particles, and wherein an average particle diameter of the second polymer particles is larger than an average particle diameter of the first polymer particles.

12 Claims, 1 Drawing Sheet

(51) Int. Cl.
  *B32B 27/36* (2006.01)
  *B32B 37/24* (2006.01)
(52) U.S. Cl.
  CPC ..... *B32B 2037/243* (2013.01); *B32B 2250/02* (2013.01); *B32B 2250/244* (2013.01); *B32B 2255/10* (2013.01); *B32B 2255/20* (2013.01); *B32B 2255/26* (2013.01); *B32B 2255/28* (2013.01); *B32B 2307/202* (2013.01); *B32B 2307/412* (2013.01); *B32B 2457/202* (2013.01)

(56) References Cited

U.S. PATENT DOCUMENTS

| | | | | |
|---|---|---|---|---|
| 5,498,450 | A | * | 3/1996 | Akashi ................. C09K 19/544 |
| | | | | 349/181 |
| 8,310,626 | B2 | | 11/2012 | Kido et al. |
| 8,801,964 | B2 | | 8/2014 | Chen |
| 2010/0302476 | A1 | * | 12/2010 | Kido ..................... G02F 1/1334 |
| | | | | 156/60 |
| 2012/0162596 | A1 | | 6/2012 | Chen |

FOREIGN PATENT DOCUMENTS

| | | |
|---|---|---|
| JP | 2608543 B2 | 5/1997 |
| JP | 2010-2664 A | 1/2010 |
| JP | 2012-137756 A | 7/2012 |
| JP | 5355879 B2 | 11/2013 |

OTHER PUBLICATIONS

The Extended European Search Report dated Mar. 25, 2024 for corresponding European Patent Application No. 21779881.8, (8 pages).

G. Spruce et al., "Polymer dispersed liquid crystal (PDLC) films", Electronics & Communication Engineering Journal, vol. 4, No. 2, Apr. 1, 1992, London, GB, pp. 91-100.

* cited by examiner

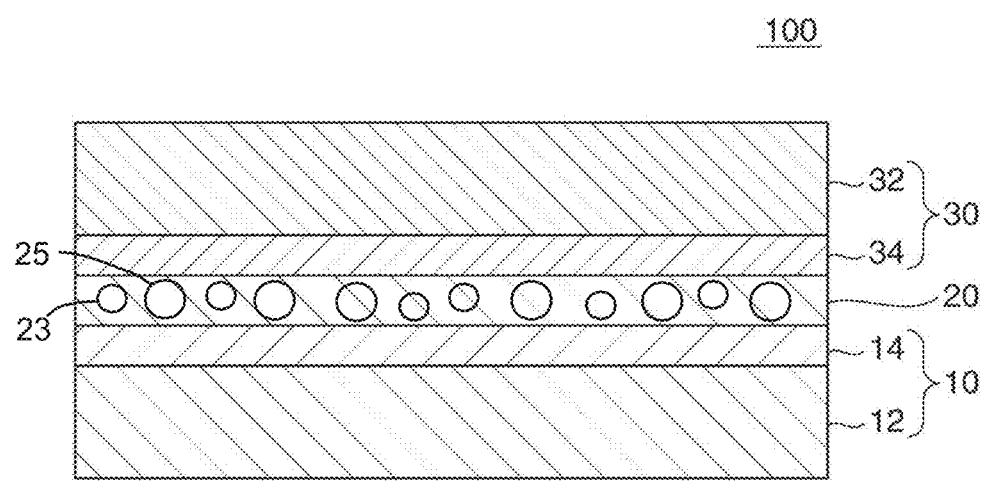

POLYMER-DISPERSED-TYPE LIQUID CRYSTAL FILM, EMULSION, AND METHOD FOR PRODUCING POLYMER-DISPERSED-TYPE LIQUID CRYSTAL FILM

CROSS REFERENCE TO RELATED APPLICATION

This application is a National Stage of International Application No. PCT/JP2021/013312, filed on Mar. 29, 2021, which designates the United States and was published in Japan, and which is based upon and claims priority to Japanese Patent Application No. 2020-062801 filed on Mar. 31, 2020 in the Japan Patent Office. All of the aforementioned applications are hereby incorporated by reference in their entireties.

TECHNICAL FIELD

The present invention relates to an emulsion including a solvent, and polymer particles and liquid crystal particles dispersed in the solvent, a method of producing a polymer dispersed liquid crystal film including using the emulsion, and a polymer dispersed liquid crystal film obtained by using the emulsion.

BACKGROUND ART

A polymer dispersed liquid crystal (hereinafter sometimes referred to as "PDLC") film including a PDLC layer between a pair of transparent electrode layers can change the extent to which transmitted light is scattered in the PDLC layer in accordance with the quantity of a voltage applied to the layer. The film can switch a state in which the light is scattered (a scattering state) and a state in which the light is transmitted (a non-scattering state or a transparent state) by, for example, switching a voltage applied state and a voltage non-applied state. In recent years, the development of such PDLC film into various applications, such as a blind or curtain application, a display application, and a projection screen application, through utilization of a function thereof has been advanced.

The following method has heretofore been known as a method of producing a PDLC film (e.g., Patent Literature 1): a mixed liquid of a monomer and a liquid crystal compound is loaded into a space between a pair of transparent conductive films; and then the monomer is polymerized by UV irradiation or the like to cause a polymerization-induced phase separation, to thereby form such a PDLC layer that the liquid crystal compound is dispersed in a polymer matrix.

In this connection, the light diffusibility of the PDLC film is proportional to the thickness of the PDLC layer, and hence the unevenness of the thickness of the PDLC layer may lead to the unevenness of the display quality of the film. Accordingly, the uniformity of the thickness of the PDLC layer is important, and the importance is high particularly in a display application. However, a variation may occur in the thickness of the PDLC layer owing to the distortion of the roundness of a laminate roll or a slight shift of the core of the roll at the time of the loading of the above-mentioned mixed liquid into the space between the transparent conductive films. In addition, the mixed liquid before the polymerization is liable to flow. Accordingly, after the loading into the space between the pair of transparent conductive films and before the polymerization, the mixed liquid may flow within the plane to deteriorate the uniformity of the thickness.

To cope with the above-mentioned problem, there has been proposed a technology including: applying such an emulsion that resin particles that have already been polymerized and liquid crystal particles are dispersed in a solvent in a uniform thickness onto a transparent conductive film; and removing the solvent by drying to form a PDLC layer excellent in thickness uniformity. The application of such an emulsion that emulsified liquid crystal particles and polymer particles are dispersed in water has been known as a specific example of the technology (Patent Literature 2 or Patent Literature 3).

CITATION LIST

Patent Literature

PTL 1 JP 2550627 B2
PTL 2 JP 2608543 B2
PTL 3 JP 5355879 B2

SUMMARY OF INVENTION

Technical Problem

In a PDLC film produced by using the above-mentioned emulsion, there may occur a problem in that a liquid crystal compound in the liquid crystal particles gradually leaks from an end portion of the PDLC layer of the film (liquid crystal leakage). The liquid crystal leakage contaminates the surroundings of the PDLC film, and moreover, the characteristics of the PDLC film change in accordance with the liquid crystal leakage.

The present invention has been made to solve the above-mentioned problems, and a primary object of the present invention is to provide a PDLC film, which includes a PDLC layer excellent in thickness uniformity and is suppressed from causing liquid crystal leakage from the PDLC layer.

Solution to Problem

According to one aspect of the present invention, there is provided a method of producing a polymer dispersed liquid crystal film, including: applying, to a first transparent conductive film, an emulsion including a solvent, and polymer particles and liquid crystal particles dispersed in the solvent to form an applied layer; drying the applied layer to form a polymer dispersed liquid crystal layer containing a polymer matrix and the liquid crystal particles dispersed in the polymer matrix; and laminating a second transparent conductive film on the polymer dispersed liquid crystal layer, wherein the polymer particles include first polymer particles and second polymer particles, and wherein an average particle diameter of the second polymer particles is larger than an average particle diameter of the first polymer particles.

In one embodiment, the average particle diameter of the second polymer particles is from 1.3 times to 20 times as large as the average particle diameter of the first polymer particles.

In one embodiment, the average particle diameter of the first polymer particles is from 10 nm to 100 nm.

In one embodiment, the average particle diameter of the second polymer particles is from 50 nm to 500 nm.

In one embodiment, the emulsion further includes a leveling agent and/or a cross-linking agent.

According to another aspect of the present invention, there is provided an emulsion for forming a polymer dispersed liquid crystal layer, including: a solvent; and polymer particles and liquid crystal particles dispersed in the solvent, wherein the polymer particles include first polymer particles and second polymer particles, and wherein an average particle diameter of the second polymer particles is larger than an average particle diameter of the first polymer particles.

In one embodiment, the average particle diameter of the second polymer particles is from 1.3 times to 20 times as large as the average particle diameter of the first polymer particles.

In one embodiment, the average particle diameter of the first polymer particles is from 10 nm to 100 nm.

In one embodiment, the average particle diameter of the second polymer particles is from 50 nm to 500 nm.

In one embodiment, the emulsion further includes a leveling agent and/or a cross-linking agent.

According to still another aspect of the present invention, there is provided a polymer dispersed liquid crystal film, including in this order: a first transparent conductive film; a polymer dispersed liquid crystal layer; and a second transparent conductive film, wherein the polymer dispersed liquid crystal layer is formed by applying the emulsion for forming a polymer dispersed liquid crystal layer to the first transparent conductive film, and drying the emulsion.

In one embodiment, the polymer dispersed liquid crystal layer has a thickness of from 1 μm to 15 μm.

Advantageous Effects of Invention

In the present invention, the PDLC layer is produced by applying and drying the emulsion including the solvent, and the polymer particles and the liquid crystal particles dispersed in the solvent, the emulsion including, as the polymer particles, the first polymer particles and the second polymer particles having an average particle diameter larger than the average particle diameter of the first polymer particles. Thus, the PDLC layer excellent in thickness uniformity, the PDLC layer being suppressed from causing liquid crystal leakage, can be obtained.

BRIEF DESCRIPTION OF DRAWINGS

FIG. 1 is a schematic sectional view of a PDLC film in one embodiment of the present invention.

DESCRIPTION OF EMBODIMENTS

Preferred embodiments of the present invention are described below. However, the present invention is not limited to these embodiments. In this description, the expression "from . . . to . . ." representing a numerical range includes the upper limit and lower limit numerical values thereof.

A. Method of producing Polymer Dispersed Liquid Crystal Film

According to one aspect of the present invention, there is provided a method of producing a PDLC film including: applying, to a first transparent conductive film, an emulsion including a solvent, and polymer particles and liquid crystal particles dispersed in the solvent (hereinafter sometimes referred to as "emulsion application liquid") to form an applied layer (step A); drying the applied layer to form a PDLC layer containing a polymer matrix and the liquid crystal particles dispersed in the polymer matrix (step B); and laminating a second transparent conductive film on the PDLC layer (step C). In the production method, the emulsion including, as the polymer particles, first polymer particles and second polymer particles having an average particle diameter larger than the average particle diameter of the first polymer particles is used. Through the application and drying of such emulsion application liquid, a PDLC film which includes a PDLC layer excellent in thickness uniformity and is suppressed from causing liquid crystal leakage from the PDLC layer can be provided.

The mechanism via which the above-mentioned effect is obtained may be assumed to be as described below, though the present invention is by no means limited by the assumption. That is, in the production of the PDLC layer through use of the emulsion application liquid, the polymer particles are not fused to each other completely (without any gap) by the evaporation of the solvent, but instead a fine gap is formed between the fused particles. As a result, a liquid crystal compound is not completely sealed in the polymer matrix but gradually leaks from an end portion of the PDLC layer through the gap. Herein, when the particle diameters of the polymer particles in the emulsion application liquid are small, the particles closely aggregate to fuse to each other, and hence a gap having a small diameter is formed. Meanwhile, the formed gap has small unevenness, which makes a shape of the gap relatively linear (and as a result, the length of a path to the end portion shortens). As a result, liquid crystal leakage is liable to occur. On the other hand, when the particle diameters of the polymer particles in the emulsion application liquid are large, the particles fuse to each other under a state in which the degree of their aggregation is loose. Accordingly, a curved gap having a large curvature is formed (and as a result, the length of the path to the end portion lengthens). Meanwhile, the formed gap has a large diameter, and as a result, the liquid crystal leakage is liable to occur. In contrast, when the polymer particles having small particle diameters and the polymer particles having large particle diameters are used in combination, a gap formed through the polymer matrix can have a small diameter and a curved shape, and as a result, the liquid crystal leakage is suppressed.

A-1. Step A

In the step A, the emulsion including the solvent, and the polymer particles and the liquid crystal particles dispersed in the solvent is applied to the first transparent conductive film to form the applied layer.

A-1-1. First Transparent Conductive Film

The first transparent conductive film typically includes a first transparent substrate and a first transparent electrode layer arranged on one side thereof. The first transparent conductive film may include a hard coat layer on one side, or each of both sides, of the first transparent substrate as required, and may include a refractive index-adjusting layer between the first transparent substrate and the first transparent electrode layer.

The surface resistance value of the first transparent conductive film is preferably from 1 Ω/□ to 1,000 Ω/□, more preferably from 5 Ω/□ to 300 Ω/□, still more preferably from 10 Ω/□ to 200 Ω/□.

The haze value of the first transparent conductive film is preferably 20% or less, more preferably 10% or less, still more preferably from 0.1% to 10%.

The total light transmittance of the first transparent conductive film is preferably 30% or more, more preferably 60% or more, still more preferably 80% or more.

The first transparent substrate may be formed by using any appropriate material. Specifically, for example, a polymer substrate, such as a film or a plastic substrate, is preferably used. This is because such substrate is excellent in smoothness and wettability to a composition for forming a transparent electrode layer, and its productivity can be significantly improved by continuous production with a roll.

A material for forming the first transparent substrate is typically a polymer film containing a thermoplastic resin as a main component. Examples of the thermoplastic resin include: a polyester-based resin; a cycloolefin-based resin such as polynorbornene; an acrylic resin; a polycarbonate resin; and a cellulose-based resin. Of those, a polyester-based resin, a cycloolefin-based resin, or an acrylic resin is preferred. Those resins are each excellent in transparency, mechanical strength, thermal stability, water barrier property, and the like. The thermoplastic resins may be used alone or in combination thereof. In addition, such an optical film as to be used in a polarizing plate, such as a low-retardation substrate, a high-retardation substrate, a retardation plate, an absorption-type polarizing film, or a polarization-selective reflective film, may be used as the first transparent substrate.

The thickness of the first transparent substrate is preferably 200 µm or less, more preferably from 3 µm to 100 µm, still more preferably from 5 µm to 70 µm. When the thickness of the first transparent substrate is set to 200 µm or less, the PDLC layer can be caused to sufficiently exhibit its function.

The total light transmittance of the first transparent substrate is preferably 30% or more, more preferably 60% or more, still more preferably 80% or more.

The first transparent electrode layer may be formed by using a metal oxide, such as an indium tin oxide (ITO), zinc oxide (ZnO), or tin oxide ($SnO_2$). A transparent electrode layer containing an ITO is preferably formed. The transparent electrode layer containing an ITO is excellent in transparency. The first transparent electrode layer may be patterned into a desired shape in accordance with purposes.

The light transmittance of the first transparent electrode layer is preferably 85% or more, more preferably 87% or more, still more preferably 90% or more. When the transparent electrode layer having a light transmittance within such ranges is used, the PDLC film has a high light transmittance under a transparent state. Although the light transmittance is preferably as high as possible, its upper limit is, for example, 99%.

The first transparent electrode layer preferably contains crystal grains. The incorporation of the crystal grains can improve the light transmittance of the layer. Although a method of forming the crystal grains is not particularly limited, the crystal grains may be suitably formed by, for example, heating under air. The area occupancy of the crystal grains in the transparent electrode layer is, for example, 30% or more, preferably 50% or more, more preferably 80% or more. The upper limit of the area occupancy is, for example, 100%. When the area occupancy of the crystal grains falls within the ranges, the light transmittance can be improved. The area occupancy of the crystal grains may be calculated from an area ratio between a crystal grain region and a non-crystalline region obtained as a result of the observation of the surface of the transparent electrode layer with a transmission electron microscope (TEM).

The surface roughness Ra of the first transparent electrode layer is, for example, 0.1 nm or more. When the surface roughness Ra of the first transparent electrode layer is less than 0.1 nm, its adhesiveness with the substrate may deteriorate. The upper limit of the surface roughness Ra of the first transparent electrode layer is preferably less than 1.2 nm, more preferably 1.0 nm or less, still more preferably less than 1.0 nm, particularly preferably 0.8 nm or less. When the surface roughness Ra of the first transparent electrode layer is excessively large, it may be difficult to suitably form the crystal grains. The term "surface roughness Ra" as used herein means an arithmetic average roughness Ra measured with an atomic force microscope (AFM).

The thickness of the first transparent electrode layer is, for example, 10 nm or more, preferably 15 nm or more. When the thickness of the transparent electrode layer is less than 10 nm, the area occupancy of the crystal grains may reduce. The upper limit of the thickness of the first transparent electrode layer is, for example, 50 nm or less, preferably 35 nm or less, more preferably less than 30 nm, still more preferably 27 nm or less. When the thickness of the transparent electrode layer is more than 50 nm, its transmittance may deteriorate, and the surface roughness of the transparent electrode layer may become larger.

The first transparent electrode layer is arranged on one surface of the first transparent substrate by, for example, sputtering. After the formation of a metal oxide layer by the sputtering, the layer can be crystallized by annealing. The annealing is performed by, for example, thermally treating the layer at from 120° C. to 300° C. for from 10 minutes to 120 minutes.

The refractive index-adjusting layer can control the hue and/or transmittance of the PDLC film. The refractive index-adjusting layer may be formed of a single layer, or may be a laminate of two or more layers.

The refractive index of the refractive index-adjusting layer is preferably from 1.3 to 1.8, more preferably from 1.35 to 1.7, still more preferably from 1.38 to 1.68. In the case where the refractive index-adjusting layer consists of a single-layer, for example, when the transparent electrode layer is an ITO, the refractive index of the refractive index-adjusting layer is rather desirably low so that the refractive index of the ITO can be optically relaxed. For example, the refractive index is preferably from 1.38 to 1.46. Thus, interface reflection between the transparent substrate and the transparent electrode layer can be suitably reduced.

The refractive index-adjusting layer is formed from inorganic matter, organic matter, or a mixture of the inorganic matter and the organic matter. Examples of a material for forming the refractive index-adjusting layer include: inorganic matter, such as NaF, $Na_3AlF_6$, LiF, $MgF_2$, $CaF_2$, $SiO_2$, $LaF_3$, $CeF_3$, l $Al_2O_3$, $TiO_2$, $Ta_2O_5$, $ZrO_2$, ZnO, ZnS, or $SiO_x$ ("x" represents a number of 1.5 or more and less than 2); and organic matter, such as an acrylic resin, an epoxy resin, a urethane resin, a melamine resin, an alkyd resin, or a siloxane-based polymer. In particular, a thermosetting resin formed of a mixture of a melamine resin, an alkyd resin, and an organic silane condensate is preferably used as the organic matter.

The refractive index-adjusting layer may contain nano-fine particles having an average particle diameter of from 1 nm to 100 nm. The incorporation of the nano-fine particles into the refractive index-adjusting layer facilitates the adjustment of the refractive index of the refractive index-adjusting layer itself.

The content of the nano-fine particles in the refractive index-adjusting layer is preferably from 0.1 wt % to 90 wt %. The content of the nano-fine particles in the refractive index-adjusting layer is more preferably from 10 wt % to 80 wt %, still more preferably from 20 wt % to 70 wt %.

Examples of an inorganic oxide for forming the nano-fine particles include silicon oxide (silica), hollow nanosilica, titanium oxide, aluminum oxide, zinc oxide, tin oxide, zirconium oxide, and niobium oxide. Of those, silicon oxide (silica), titanium oxide, aluminum oxide, zinc oxide, tin oxide, zirconium oxide, and niobium oxide are preferred. Those inorganic oxides may be used alone or in combination thereof.

The thickness of the refractive index-adjusting layer is preferably from 10 nm to 200 nm, more preferably from 20 nm to 150 nm, still more preferably from 30 nm to 130 nm. When the thickness of the refractive index-adjusting layer is excessively small, the layer hardly becomes a continuous film. When the thickness of the refractive index-adjusting layer is excessively large, there is a tendency in that the transparency of the PDLC film in a transparent state reduces or a crack is liable to occur.

The refractive index-adjusting layer may be formed by, for example, a coating method, such as a wet method, a gravure coating method, or a bar coating method, a vacuum deposition method, a sputtering method, or an ion plating method through use of the above-mentioned material.

A-1-2. Emulsion Application Liquid

The emulsion application liquid includes the solvent, and the polymer particles and the liquid crystal particles dispersed in the solvent. The polymer particles include the first polymer particles and the second polymer particles having an average particle diameter larger than the average particle diameter of the first polymer particles. The emulsion application liquid preferably further includes a leveling agent and/or a cross-linking agent.

The average particle diameter of the first polymer particles is preferably from 10 nm to 100 nm, more preferably from 15 nm to 90 nm, still more preferably from 20 nm to 80 nm. When the average particle diameter of the first polymer particles is less than 10 nm, the surface free energy of each of the particles is high. Accordingly, only the first polymer particles aggregate at the time of the drying of the applied layer, and hence a liquid crystal leakage-suppressing effect becomes insufficient in some cases. When the average particle diameter of the first polymer particles is more than 100 nm, a difference between the average particle diameter of the first polymer particles and the average particle diameter of the second polymer particles becomes smaller, and hence the liquid crystal leakage-suppressing effect becomes insufficient in some cases. The average particle diameter of each of the first polymer particles and the second polymer particles means a median diameter on a volume basis, and may be measured with a dynamic light scattering-type particle size distribution-measuring apparatus.

The coefficient of variation (CV value) of the average particle diameter of the first polymer particles may be, for example, less than 1.0, and may be preferably 0.5 or less, more preferably from 0.2 to 0.4.

A polymer for forming the first polymer particles may be appropriately selected in accordance with, for example, the light transmittance thereof, the refractive indices of the liquid crystal particles and the second polymer particles, and the adhesive strength thereof with the transparent conductive film. The polymer for forming the first polymer particles may be an optically isotropic resin, or may be an optically anisotropic resin. The polymer is, for example, a water-dispersible resin, such as a polyurethane-based, polyether-based, polyester-based, polycarbonate-based, or acrylic water-dispersible resin. Of those, a polyurethane-based or acrylic water-dispersible resin is preferably used.

The average particle diameter of the second polymer particles is preferably from 50 nm to 500 nm, more preferably from 80 nm to 400 nm, still more preferably from 100 nm to 300 nm. When the average particle diameter of the second polymer particles is less than 50 nm, a difference between the average particle diameter of the second polymer particles and the average particle diameter of the first polymer particles becomes smaller, and hence the liquid crystal leakage-suppressing effect becomes insufficient in some cases. When the average particle diameter of the second polymer particles is more than 500 nm, the particles do not uniformly mingle with the first polymer particles, and hence light diffusion between the polymers occurs in some cases. As a result, a PDLC film having high transparency under a transparent state may not be obtained.

The coefficient of variation (CV value) of the average particle diameter of the second polymer particles may be, for example, less than 1.0, and may be preferably 0.5 or less, more preferably from 0.2 to 0.4.

A polymer for forming the second polymer particles may be appropriately selected in accordance with, for example, the light transmittance thereof, the refractive indices of the liquid crystal particles and the first polymer particles, and the adhesive strength thereof with the transparent conductive film. The polymer for forming the second polymer particles may be an optically isotropic resin, or may be an optically anisotropic resin. As the polymer for forming the second polymer particles, the same polymer as the polymer for forming the first polymer particles is exemplified. The first polymer particles and the second polymer particles may be formed of the same kind of polymer, or may be formed of different kinds of polymers.

The ratio (average particle diameter of the second polymer particles/average particle diameter of the first polymer particles) of the average particle diameter of the second polymer particles to the average particle diameter of the first polymer particles may be preferably from 1.3 to 20, more preferably from 1.3 to 10, still more preferably from 1.5 to 5. When the ratio is less than 1.3, a liquid crystal leakage-suppressing effect may be insufficient. When the ratio is more than 20, the first polymer particles and the second polymer particles may not uniformly mingle with each other.

The content ratio of the polymer particles (total content ratio of the first polymer particles and the second polymer particles) in the solid content of the emulsion application liquid may be preferably 70 wt % or less, more preferably from 40 wt % to 60 wt %.

A content ratio (former:latter, weight basis) between the first polymer particles and the second polymer particles in the emulsion application liquid may be preferably from 2:8 to 8:2, more preferably from 3:7 to 7:3.

Any appropriate liquid crystal compound may be used as a liquid crystal compound for forming the above-mentioned liquid crystal particles, and a liquid crystal compound having preferably a birefringence $\Delta n$ ($=n_e-n_o$; $n_e$ represents the refractive index of a molecule of the liquid crystal compound in a major axis direction, and no represents the refractive index of the molecule of the liquid crystal compound in a minor axis direction) of from 0.05 to 0.25, more preferably a birefringence $\Delta n$ of from 0.05 to 0.20 at a wavelength of 589 nm is used.

The dielectric anisotropy of the liquid crystal compound may be positive or negative. The liquid crystal compound may be, for example, a nematic-, smectic-, or cholesteric-type liquid crystal compound. A nematic-type liquid crystal compound is preferably used because excellent transparency of the PDLC film in a transparent state can be achieved.

Examples of the nematic-type liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound.

The average particle diameter of the liquid crystal particles is preferably 1 μm or more, more preferably 2 μm or more. The average particle diameter of the liquid crystal particles is preferably 9 μm or less, more preferably 8 μm or less. When the average particle diameter of the liquid crystal particles falls within the ranges, the average particle diameter of liquid crystal droplets in the PDLC layer can be set within a desired range. The average particle diameter of the liquid crystal particles is a volume-average particle diameter.

The average particle diameter of the liquid crystal particles preferably has a relatively narrow particle size distribution. The coefficient of variation (CV value) of the average particle diameter of the liquid crystal particles may be, for example, less than 0.40, and may be preferably 0.35 or less, more preferably 0.30 or less. In one embodiment, an emulsion application liquid substantially free of any liquid crystal capsules each having a particle diameter of less than 1 μm or more than 9 μm (e.g., an emulsion application liquid in which the ratio of the volume of liquid crystal particles each having a particle diameter of less than 1 μm or more than 9 μm to the total volume of the liquid crystal particles is 10% or less) may be used.

The content ratio of the liquid crystal particles in the solid content of the emulsion application liquid may be preferably 30 wt % or more, more preferably from 40 wt % to 60 wt %.

As described above, the emulsion application liquid preferably further includes a leveling agent. While the particle diameters of the liquid crystal particles in the emulsion application liquid are of the order of micrometers, the particle diameters of the polymer particles are of the order of nanometers. Accordingly, after the volatilization of the solvent from the applied layer by its drying, a place in which the liquid crystal particles are dispersed is locally increased in thickness as compared to a place in which the particles are not dispersed. As a result, fine unevenness may occur on the surface of a coating film after the drying at a period of from several micrometers to several tens of micrometers. Such unevenness causes the inclusion of fine air bubbles at the time of the lamination of the second transparent conductive film. Thus, the transparency of the PDLC film at the time of its voltage application and the reliability thereof may be reduced. Accordingly, the addition of the leveling agent can suppress such unevenness to prevent the inclusion of fine air bubbles at the time of the lamination of the second transparent conductive film.

Examples of the leveling agent include an acrylic leveling agent, a fluorine-based leveling agent, and a silicone-based leveling agent. Examples of the acrylic leveling agent include POLYFLOW No. 36, POLYFLOW No. 56, POLYFLOW No. 85HF, and POLYFLOW No. 99C (all of which are manufactured by Kyoeisha Co., Ltd.). Examples of the fluorine-based leveling agent include MEGAFACE F-444, MEGAFACE F-470N, and MEGAFACE F-556 (all of which are manufactured by DIC Corporation). Examples of the silicone-based leveling agent include LE303 (manufactured by Kyoeisha Co., Ltd.) and GRANDIC PC4100 (manufactured by DIC Corporation).

The content ratio of the leveling agent is preferably from 0.05 part by weight to 10 parts by weight, more preferably from 0.1 part by weight to 1 part by weight with respect to 100 parts by weight of the emulsion application liquid.

In addition, the emulsion application liquid may include a cross-linking agent. The use of the cross-linking agent enables the formation of a PDLC layer containing a polymer matrix having a cross-linked structure.

Any appropriate cross-linking agent may be used as the cross-linking agent. Examples thereof include an aziridine-based cross-linking agent and an isocyanate-based cross-linking agent.

The content ratio of the cross-linking agent is preferably from 0.5 part by weight to 10 parts by weight, more preferably from 0.8 part by weight to 5 parts by weight with respect to 100 parts by weight of the emulsion application liquid.

The emulsion application liquid may be prepared by, for example, mixing a resin emulsion containing the first polymer particles, a resin emulsion containing the second polymer particles, a liquid crystal emulsion containing the liquid crystal particles, and an optional component (e.g., the leveling agent or the cross-linking agent). A solvent or a dispersant may be further added at the time of the mixing as required. Alternatively, the emulsion application liquid may also be prepared by, for example, adding the liquid crystal compound and water-dispersible resins to the solvent, and mechanically dispersing the materials in the solvent. Water or a mixed solvent of water and a water-miscible organic solvent may be preferably used as the solvent.

The resin emulsions and the liquid crystal emulsion described above may each be prepared by, for example, a mechanical emulsification method, a microchannel method, or a membrane emulsification method. The liquid crystal emulsion is preferably prepared by the membrane emulsification method out of those methods. According to the membrane emulsification method, an emulsion having a uniform particle size distribution may be suitably obtained. Reference may be made to the disclosures of, for example, JP 04-355719 A and JP 2015-40994 A (these literatures are incorporated herein by reference) for details about the membrane emulsification method.

The solid content concentration of the emulsion application liquid may be, for example, from 20 wt % to 60 wt %, preferably from 30 wt % to 50 wt %.

The viscosity of the emulsion application liquid may be appropriately adjusted so that its application to the first transparent conductive film may be suitably performed. The viscosity of the emulsion application liquid at the time of the application is preferably from 20 mPa·s to 400 mPa·s, more preferably from 30 mPa·s to 300 mPa·s, still more preferably from 40 mPa·s to 200 mPa·s. When the viscosity is less than 20 mPa·s, the convection of the solvent may become remarkable at the time of the drying of the solvent to destabilize the thickness of the PDLC layer. When the viscosity is more than 400 mPa·s, the beads of the emulsion application liquid may not be stable. The viscosity of the emulsion application liquid may be measured with, for example, a rheometer MCR302 manufactured by Anton Paar GmbH. The value of a shear viscosity under the conditions of 20° C. and a shear rate of 1,000 (1/s) is used as the viscosity herein.

A-1-3. Application

The emulsion for PDLC formation is typically applied to the surface of the first transparent conductive film on its transparent electrode layer side.

Any appropriate method may be adopted as a method of applying the emulsion for PDLC formation. Examples thereof include a roll coating method, a spin coating method, a wire bar coating method, a dip coating method, a die coating method, a curtain coating method, a spray coating method, and a knife coating method (e.g., a comma coating method). Of those, a roll coating method is preferred. For example, reference may be made to the description of JP 2019-5698 A for the application by the roll coating method with a slot die.

The thickness of the applied layer is preferably from 3 µm to 40 µm, more preferably from 4 µm to 30 µm, still more preferably from 5 µm to 20 µm. When the thickness falls within such ranges, a PDLC layer excellent in thickness uniformity can be obtained.

A-2. Step B

In the step B, the applied layer is dried to form the PDLC layer. In one embodiment, the PDLC layer is brought into a transparent state by applying a voltage thereto, and is brought into a scattering state under a state in which no voltage is applied thereto (normal mode). In another embodiment, the PDLC layer is brought into the scattering state by applying a voltage thereto, and is brought into the transparent state under a state in which no voltage is applied thereto (reverse mode).

The drying of the applied layer may be performed by any appropriate method. Specific examples of the drying method include heat drying and hot-air drying. When the emulsion application liquid includes a cross-linking agent, the cross-linked structure of the polymer matrix may be formed at the time of the drying.

A drying temperature is preferably from 20° C. to 150° C., more preferably from 25° C. to 80° C. A drying time is preferably from 1 minute to 100 minutes, more preferably from 2 minutes to 10 minutes. When the drying temperature and the drying time are appropriately set, the first and second polymer particles fuse to each other, and hence a PDLC layer excellent in liquid crystal leakage-suppressing effect can be obtained.

The PDLC layer contains the polymer matrix and the liquid crystal particles dispersed in the polymer matrix. The polymer for forming the polymer matrix and the liquid crystal compound in each of the liquid crystal particles are as described in the section A-1.

The content ratio of the polymer matrix in the PDLC layer is preferably 80 wt % or less, more preferably 70 wt % or less, still more preferably 60 wt % or less, and is preferably 35 wt % or more, more preferably 40 wt % or more. In one embodiment, the content ratio is from 35 wt % to 70 wt %. When the content ratio of the polymer matrix is less than 35 wt %, the liquid crystal particles may not be independently dispersed in the polymer, and hence at least partially form a continuous phase. Accordingly, liquid crystal leakage may occur. In addition, a problem such as the impairment of the mechanical strength of the PDLC layer may occur. Meanwhile, when the content of the polymer matrix is more than 80 wt %, a problem, such as an increase in driving voltage of the PDLC film or a reduction in light-controlling function thereof, may occur.

The content ratio of the liquid crystal compound in the PDLC layer is preferably 20 wt % or more, more preferably 30 wt % or more, still more preferably 40 wt % or more, and is preferably 65 wt % or less, more preferably 60 wt % or less. In one embodiment, the content ratio is from 20 wt % to 65 wt %.

The average particle diameter of the liquid crystal particles (liquid crystal droplets) in the PDLC layer may be, for example, from 1 µm to 9 µm, preferably from 2 µm to 8 µm. When the average particle diameter of the liquid crystal particles is excessively small, the ratio of long-wavelength light in transmitted light when the PDLC film is in a transparent state may increase to change the hue of the PDLC film to an orangish hue. When the average particle diameter is excessively large, the ratio of short-wavelength light in the transmitted light when the PDLC film is in the transparent state may increase to change the hue of the PDLC film to a bluish hue. The average particle diameter of the liquid crystal particles in the PDLC layer is the volume-average particle diameter of the liquid crystal particles when the layer is viewed from a direction perpendicular to the main surface of the PDLC film.

The thickness of the PDLC layer is, for example, from 1 µm to 15 µm, preferably from 1 µm to 12 µm, more preferably from 2 µm to 10 µm. When the thickness of the PDLC layer is set to 15 µm or less, the area of the PDLC layer exposed to an end portion of the PDLC film can be reduced, and the reduction may contribute to the prevention of liquid crystal leakage from the end portion.

A-3. Step C

In the step C, the second transparent conductive film is laminated on the PDLC layer. Thus, the PDLC film including the first transparent conductive film, the PDLC layer, and the second transparent conductive film in the stated order is obtained.

The second transparent conductive film typically includes a second transparent substrate and a second transparent electrode layer arranged on one side thereof. The second transparent conductive film may include a hard coat layer on one side, or each of both sides, of the second transparent substrate as required, and may include a refractive index-adjusting layer between the second transparent substrate and the second transparent electrode layer.

The surface resistance value of the second transparent conductive film is preferably from 1 $\Omega/\square$ to 1,000 $\Omega/\square$, more preferably from 5 $\Omega/\square$ to 300 $\Omega/\square$, still more preferably from 10 $\Omega/\square$ to 200 $\Omega/\square$.

The haze value of the second transparent conductive film is preferably 20% or less, more preferably 10% or less, still more preferably from 0.1% to 10%.

The total light transmittance of the second transparent conductive film is preferably 30% or more, more preferably 60% or more, still more preferably 80% or more.

The same descriptions as those of the first transparent substrate and the first transparent electrode layer may be applied to the second transparent substrate and the second transparent electrode layer, respectively. The second transparent conductive film may have the same configuration as that of the first transparent conductive film, or may have a configuration different therefrom.

The lamination of the second transparent conductive film on the PDLC layer is performed so that the second transparent electrode layer side of the film may face the PDLC layer. From the viewpoint of obtaining sufficient adhesiveness, the lamination may be preferably performed while a lamination pressure of from 0.006 MPa/m to 7 MPa/m, more preferably a lamination pressure of from 0.06 MPa/m to 0.7 MPa/m is applied with a laminator.

B. Polymer Dispersed Liquid Crystal Film

A polymer dispersed liquid crystal film according to an embodiment of the present invention includes a first transparent conductive film, a PDLC layer, and a second transparent conductive film in the stated order.

FIG. 1 is a schematic sectional view of a PDLC film in one embodiment of the present invention. A PDLC film 100 includes a first transparent conductive film 10, a PDLC layer 20, and a second transparent conductive film 30 in the stated order. The first transparent conductive film 10 includes a first transparent substrate 12 and a first transparent electrode layer 14 arranged on one side (PDLC layer 20 side) thereof. In addition, the second transparent conductive film 30 includes a second transparent substrate 32 and a second transparent electrode layer 34 arranged on one side (PDLC layer 20 side) thereof.

The first transparent conductive film 10, the PDLC layer 20, and the second transparent conductive film 30 are as described in the section A.

The PDLC layer is formed by applying the emulsion application liquid described in the section A-1-2. to the first transparent conductive film, and drying the liquid, and may have a polymer matrix structure that hardly causes liquid crystal leakage by virtue of the fact that the emulsion application liquid includes the first polymer particles 23 and the second polymer particles 25 having an average particle diameter larger than the average particle diameter of the first polymer particles.

The total thickness of the PDLC film is, for example, from 30 μm to 250 μm, preferably from 50 μm to 150 μm.

EXAMPLES

The present invention is specifically described below by way of Examples. However, the present invention is by no means limited to these Examples. Measurement methods for characteristics are as described below. In addition, unless otherwise specified, "part(s)" and "%" in Examples and Comparative Example are by weight.

(1) Thickness

Measurement was performed with a digital micrometer (manufactured by Anritsu Corporation, product name: "KC-351C").

(2) Average Particle Diameter of Polymer Particles

Several droplets of a resin dispersion were added to 100 mL of water to prepare a measurement sample. The measurement sample was set in the measurement holder of a dynamic light scattering-type particle diameter distribution-measuring apparatus (manufactured by Microtrac Retsch GmbH, apparatus name: "Nanotrac 150"), and the fact that the concentration of the measurement sample was measurable was confirmed with the monitor of the apparatus, followed by the measurement of the average particle diameter of the dispersion with the apparatus.

(3) Volume-average Particle Diameter of Liquid Crystal Particles in PDLC Layer

The second transparent conductive film of a PDLC film was peeled to expose its PDLC layer. After that, the surface of the exposed PDLC layer was observed with a transmission optical microscope and an objective lens having a magnification of 100 in a 100-micrometer square field of view. During the observation, while the focus of the lens was gradually changed, the particle diameter of each of the liquid crystal particles was measured in a 0.1 μm unit at the focus position at which the liquid crystal particle was brought into focus to the maximum extent. The volume-average particle diameter of the particles and a volume coefficient of variation (CV value) calculated from the following equation were calculated by subjecting the measured values to statistical treatment on a volume basis.

CV value=standard deviation of particle diameter distribution on volume basis/volume-average particle diameter (4) Volume-average Particle Diameter of Liquid Crystal Capsules in Liquid Crystal Emulsion 0.1 Weight percent of a liquid crystal emulsion was added to 200 ml of an electrolyte aqueous solution (manufactured by Beckman Coulter, Inc., "ISOTON II"), and the resultant mixed liquid was used as a measurement sample. The particle diameters of particles in the sample were measured with a MULTISIZER 3 (manufactured by Beckman Coulter, Inc., aperture size=20 μm), and the statistics of volumes were collected for each discretized particle diameter by dividing the measured values into 256 sections arranged at equal intervals in the range of from 0.4 μm to 12 μm on a logarithmic scale, followed by the calculation of the volume-average particle diameter of the particles and a volume coefficient of variation (CV value) calculated from the following equation. When particles each having a particle diameter of 12 μm or more were present, the volume-average particle diameter and the CV value were calculated by: setting the aperture size to 30 μm; and dividing the measured values into 256 sections arranged at equal intervals in the range of from 0.6 μm to 18 μm on a logarithmic scale to collect the statistics of volumes for each discretized particle diameter.

CV value=standard deviation of particle diameter distribution on volume basis/volume-average particle diameter

Example 1

(First and Second Transparent Conductive Films)

An ITO layer was formed on one surface of a PET substrate (thickness: 50 μm) by a sputtering method to provide a transparent conductive film having the configuration [transparent substrate/transparent electrode layer].

(Production of Emulsion Application Liquid)

59.7 Parts of a liquid crystal compound (manufactured by JNC Corporation, product name: "LX-153XX", birefringence Δn=0.149 ($n_e$=1.651, $n_o$=1.502), viscosity=48.5 mPa·s), 39.8 parts of pure water, and 0.5 part of a dispersant (manufactured by DKS Co., Ltd., "NOIGEN ET159") were mixed, and the mixture was stirred with a homogenizer at 100 rpm for 10 minutes to prepare a liquid crystal emulsion. The average particle diameter of liquid crystal particles in the resultant liquid crystal emulsion was 3.4 μm.

38.4 Parts of the above-mentioned liquid crystal emulsion, 19.1 parts of a polyether-based polyurethane resin aqueous dispersion (manufactured by DSM, product name: "NeoRez R967", polymer average particle diameter: 80 nm, CV value=0.27, solid content: 40 wt %), 17.0 parts of a polyester-based polyurethane resin aqueous dispersion (manufactured by Sanyo Chemical Industries, Ltd., product name: "UCOAT C-102", polymer average particle diameter: 168 nm, CV value=0.23, solid content: 45 wt %), 0.1 part of a leveling agent (manufactured by DIC Corporation, product name: "F-444"), 1.1 parts of a cross-linking agent (propylidynetrimethyl tris[3-(2-methylaziridin-1-yl)propionate]), and 24.3 parts of pure water were mixed to provide an emulsion application liquid (solid content concentration: 40 wt %).

(Application and Drying of Emulsion Application Liquid)

The above-mentioned emulsion application liquid was applied to the ITO layer surface of the first transparent conductive film to form an applied layer having a thickness of 20 µm. The application was performed with a slot die, and a line speed was 6 m/min. Next, the applied layer was dried at 25° C. for 8 minutes to form a PDLC layer having a thickness of 8 µm.

(Lamination of Second Transparent Conductive Film)

While a lamination pressure of 0.4 MPa/m was applied with a laminator, the second transparent conductive film was laminated on the above-mentioned PDLC layer so that its ITO layer faced the PDLC layer. Thus, a PDLC film was obtained.

Example 2

A PDLC film was obtained in the same manner as in Example 1 except that an emulsion application liquid was prepared as follows: the blending amount of the polyether-based polyurethane resin aqueous dispersion was set to 12.8 parts; and the blending amount of the polyester-based polyurethane resin aqueous dispersion was set to 22.8 parts.

Example 3

A PDLC film was obtained in the same manner as in Example 1 except that an emulsion application liquid was prepared by using a liquid crystal compound (manufactured by JNC Corporation, product name: "LX-154XX", birefringence $\Delta n=0.198$ ($n_e=1.709$, $n_o=1.511$), viscosity: 57.5 mPa·s) instead of the liquid crystal compound (product name: "LX-153XX").

Example 4

A PDLC film was obtained in the same manner as in Example 1 except that an emulsion application liquid was prepared as follows: an isocyanate-curable hydroxy group-containing acrylic resin emulsion (manufactured by DIC Corporation, product name: "BURNOCK WE-314", polymer average particle diameter: 140 nm, CV value=0.25, solid content: 45 wt %) was used instead of the polyester-based polyurethane resin aqueous dispersion; the blending amount of the liquid crystal emulsion was set to 32.4 parts; the blending amount of the polyether-based polyurethane resin aqueous dispersion was set to 11.5 parts; the blending amount of the isocyanate-curable hydroxy group-containing acrylic resin emulsion was set to 30.8 parts; the blending amount of the leveling agent was set to 0.04 part; the blending amount of the cross-linking agent was set to 1.4 parts; and the blending amount of the pure water was set to 13.6 parts.

Comparative Example 1

A PDLC film was obtained in the same manner as in Example 1 except that an emulsion application liquid was prepared as follows: the blending amount of the polyether-based polyurethane resin aqueous dispersion was set to 0 parts; and the blending amount of the polyester-based polyurethane resin aqueous dispersion was set to 34.7 parts.

Each of the PDLC films obtained in Examples and Comparative Example was evaluated for its optical characteristic and liquid crystal leakage by the following methods. The results are shown in Table 1 together with the compositions of the emulsion application liquids.

«Optical Characteristic»

A haze when an AC voltage of 30 V was applied to each of the PDLC films obtained in Examples and Comparative Example described above with an AC power source "EC750SA" manufactured by NF CORPORATION, and a haze when no voltage was applied thereto were measured.

«Method of evaluating Liquid Crystal Leakage»

Each of the PDLC films was cut into a plurality of A4-size pieces, and the pieces were laminated. A surface pressure was continuously applied to the PDLC film as follows: the laminated block was sandwiched between transparent polycarbonate plates each having a thickness of 2 mm, or a one-kilogram-weight dead weight was further mounted on the sandwiched product, followed by standing at room temperature for 24 hours. After that, lamination interfaces between the PDLC film pieces, or lamination interfaces between the PDLC film and each of the polycarbonate plates was observed. When the traces of bleeding of a size measuring 1 mm or more by 1 mm or more were observed at one or more sites, liquid crystal leakage was judged to be "present", and when no traces of such bleeding were observed, the liquid crystal leakage was judged to be "absent". The bleeding was caused by the permeation of a liquid (liquid crystal compound) leaked from an end portion of the PDLC film into the space between the PDLC film pieces, or the space between the PDLC film and the polycarbonate plate.

TABLE 1

| | | | Example 1 | Example 2 | Example 3 | Example 4 | Comparative Example 1 |
|---|---|---|---|---|---|---|---|
| Application liquid | First polymer particles | Kind | NeoRez R967 | NeoRez R967 | NeoRez R967 | NeoRez R967 | — |
| | | Average particle diameter (nm) | 80 | 80 | 80 | 80 | — |
| | | Solid content concentration in application liquid (wt %) | 7.7 | 7.7 | 7.7 | 4.5 | — |
| | Second polymer particles | Kind | C-102 | C-102 | C-102 | WE314 | C-102 |
| | | Average particle diameter (nm) | 168 | 168 | 168 | 140 | 168 |
| | | Solid content concentration in application liquid (wt %) | 7.7 | 7.7 | 7.7 | 13.5 | 15.6 |

TABLE 1-continued

|  |  |  | Example 1 | Example 2 | Example 3 | Example 4 | Comparative Example 1 |
|---|---|---|---|---|---|---|---|
|  | Liquid crystal particles | Kind | LX-153XX | LX-153XX | LX-154XX | LX-153XX | LX-153XX |
|  |  | Average particle diameter (μm) | 3.4 | 3.4 | 3.4 | 3.4 | 3.4 |
|  |  | Solid content concentration in application liquid (wt %) | 22.4 | 22.4 | 22.4 | 18.6 | 22.4 |
| Optical characteristic | Haze | When voltage is applied | 28% | 28% | 22% | 22% | 22% |
|  |  | When no voltage is applied | 94% | 94% | 92% | 90% | 96% |
| Mechanical characteristic | Liquid crystal leakage | No dead weight | Absent | Absent | Absent | Absent | Present |
|  |  | 1 kg-weight | Absent | Absent | Absent | Absent | Present |

As shown in Table 1, while the liquid crystal leakage occurred in the PDLC film of Comparative Example, the occurrence of the liquid crystal leakage was prevented in each of the PDLC films of Examples. In addition, each of the PDLC films of Examples was excellent in uniformity of the thickness of its PDLC layer by virtue of the fact that the layer was formed by using the emulsion application liquid.

INDUSTRIAL APPLICABILITY

The PDLC film of the present invention is suitably used in various applications, such as a blind or curtain application, a display application, and a projection screen application.

Reference Signs List

100 PDLC film
10 first transparent conductive film
20 PDLC layer
30 second transparent conductive film

The invention claimed is:

1. A method of producing a polymer dispersed liquid crystal film, comprising:
applying, to a first transparent conductive film, an emulsion including a solvent, and polymer particles and liquid crystal particles dispersed in the solvent to form an applied layer;
drying the applied layer to form a polymer dispersed liquid crystal layer containing a polymer matrix and the liquid crystal particles dispersed in the polymer matrix; and
laminating a second transparent conductive film on the polymer dispersed liquid crystal layer,
wherein the polymer particles include first polymer particles and second polymer particles, and
wherein an average particle diameter of the second polymer particles is larger than an average particle diameter of the first polymer particles.

2. The production method according to claim 1, wherein the average particle diameter of the second polymer particles is from 1.3 times to 20 times as large as the average particle diameter of the first polymer particles.

3. The production method according to claim 1, wherein the average particle diameter of the first polymer particles is from 10 nm to 100 nm.

4. The production method according claim 1, wherein the average particle diameter of the second polymer particles is from 50 nm to 500 nm.

5. The production method according to claim 1, wherein the emulsion further includes a leveling agent and/or a cross-linking agent.

6. An emulsion for forming a polymer dispersed liquid crystal layer, comprising:
a solvent; and
polymer particles and liquid crystal particles dispersed in the solvent,
wherein the polymer particles include first polymer particles and second polymer particles, and
wherein an average particle diameter of the second polymer particles is larger than an average particle diameter of the first polymer particles.

7. The emulsion according to claim 6, wherein the average particle diameter of the second polymer particles is from 1.3 times to 20 times as large as the average particle diameter of the first polymer particles.

8. The emulsion according to claim 6, wherein the average particle diameter of the first polymer particles is from 10 nm to 100 nm.

9. The emulsion according to claim 6, wherein the average particle diameter of the second polymer particles is from 50 nm to 500 nm.

10. The emulsion according to claim 6, further comprising a leveling agent and/or a cross-linking agent.

11. A polymer dispersed liquid crystal film, comprising in this order:
a first transparent conductive film;
a polymer dispersed liquid crystal layer; and
a second transparent conductive film,
wherein the polymer dispersed liquid crystal layer is formed by applying the emulsion for forming a polymer dispersed liquid crystal layer of claim 6 to the first transparent conductive film, and drying the emulsion.

12. The polymer dispersed liquid crystal film according to claim 11, wherein the polymer dispersed liquid crystal layer has a thickness of from 1 μm to 15 μm.

* * * * *